/

US008630659B2

(12) United States Patent
Lewis

(10) Patent No.: US 8,630,659 B2
(45) Date of Patent: Jan. 14, 2014

(54) SYSTEMS AND METHODS OF DELIVERING CONTENT TO AN OCCUPANT IN A VEHICLE

(75) Inventor: Derek Lane Lewis, Ida, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 280 days.

(21) Appl. No.: 12/853,588

(22) Filed: Aug. 10, 2010

(65) Prior Publication Data

US 2012/0040652 A1   Feb. 16, 2012

(51) Int. Cl.
H04W 24/00        (2009.01)

(52) U.S. Cl.
USPC ............... 455/456.3; 455/456.2; 455/420; 455/466; 455/414.3; 370/338; 340/993; 340/995.11; 340/996

(58) Field of Classification Search
USPC ........ 455/414.1, 436, 456.1, 414.3, 420, 466, 455/432.1, 404.2; 379/88.17; 370/328–338; 340/328–338
See application file for complete search history.

(56) References Cited

U.S. PATENT DOCUMENTS

| | | | |
|---|---|---|---|
| 5,864,753 A * | 1/1999 | Morita et al. | 455/186.1 |
| 6,970,915 B1 | 11/2005 | Partovi et al. | |
| 7,610,011 B2 | 10/2009 | Albrett | |
| 8,442,524 B2 * | 5/2013 | Jendbro et al. | 455/434 |
| 8,463,267 B2 * | 6/2013 | You et al. | 455/435.2 |
| 2003/0156097 A1 * | 8/2003 | Kakihara et al. | 345/156 |
| 2004/0028195 A1 | 2/2004 | Leyden et al. | |
| 2004/0117405 A1 * | 6/2004 | Short et al. | 707/104.1 |
| 2006/0062202 A1 * | 3/2006 | Oesterling et al. | 370/352 |
| 2006/0195239 A1 * | 8/2006 | Teichner et al. | 701/36 |
| 2007/0186006 A1 | 8/2007 | Murray | |
| 2008/0004790 A1 | 1/2008 | Ames | |
| 2008/0304636 A1 | 12/2008 | Souluer | |
| 2009/0071316 A1 | 3/2009 | Oppenheimer | |
| 2009/0163194 A1 | 6/2009 | Mazzara et al. | |
| 2009/0176468 A1 | 7/2009 | Ciatti et al. | |
| 2009/0176469 A1 | 7/2009 | Nagara et al. | |
| 2009/0186583 A1 | 7/2009 | Seil et al. | |
| 2009/0205002 A1 | 8/2009 | Massiah | |
| 2010/0049626 A1 | 2/2010 | Hong et al. | |

* cited by examiner

Primary Examiner — Mahendra Patel
Assistant Examiner — Quan M Hua
(74) Attorney, Agent, or Firm — Dinsmore & Shohl LLP

(57) ABSTRACT

A method of delivering content to an occupant in a vehicle, the method comprising: establishing an Internet connection using an electronic cellular device, the electronic device being integrated with an HMI system of the vehicle, the HMI system including HMI controls; searching for a content source providing an Internet media stream by selecting a content category using the HMI controls; connecting to the content source using the Internet connection; and playing the Internet media stream using a speaker of the vehicle.

18 Claims, 4 Drawing Sheets

| CALL LETTERS | FREQ | LOCATION | FORMAT | URL |
|---|---|---|---|---|
| WLQT | 99.9 FM | KETTERING, OH | ADULT CONTEMPORARY | URL |
| WLRD | 96.9 FM | WILLARD, OH | GOSPEL MUSIC | URL |
| WLRX | 107.1 FM | IRONTON, OH | ALTERNATIVE | URL |
| WLRY | 88.9 FM | RUSHVILLE, OH | CHRISTIAN CONTEMPORARY | URL |
| WLTP | 910 AM | MARIETTA, OH | NEWS | URL |
| WLVQ | 96.3 FM | COLUMBUS, OH | CLASSIC ROCK | URL |
| WLW | 700 AM | CINCINNATI, OH | NEWS/TALK | URL |
| WLZT | 93.3 FM | ASHVILLE, OH | CLASSIC HITS | URL |
| WLZZ | 104.5 FM | MONTPELIER, OH | COUNTRY | URL |
| WMAN | 1400 AM | MANSFIELD, OH | TALK | URL |
| WMCO | 90.7 FM | NEW CONCORD, OH | VARIETY | URL |
| WMJI | 105.7 FM | CLEVELAND, OH | OLDIES | URL |
| WMJK | 100.9 FM | CLYDE, OH | CLASSIC ROCK | URL |
| WMKV | 89.3 FM | READING, OH | NOSTALGIA | URL |
| WMLX | 103.3 FM | SAINT MARYS, OH | HOT AC | URL |
| WMMS | 100.7 FM | CLEVELAND, OH | ROCK | URL |
| WMMX | 107.7 FM | DAYTON, OH | HOT AC | URL |
| WMNI | 920 AM | COLUMBUS, OH | NOSTALGIA | URL |
| WMOA | 1490 AM | MARIETTA, OH | ADULT CONTEMPORARY | URL |

FIG. 4

SYSTEMS AND METHODS OF DELIVERING CONTENT TO AN OCCUPANT IN A VEHICLE

TECHNICAL FIELD

The present specification generally relates to systems and methods of delivering content to an occupant in a vehicle.

BACKGROUND

Many vehicles provide entertainment systems, such as radios. Radios are typically tuned by frequency and may include preset channels that are saved in memory to allow the vehicle occupant quick access to certain favorite radio stations. However, these preset radio stations are typically only available within a limited range. Additionally, some regions may have limited access to terrestrial radio broadcasts. There is a desire to provide multiple options for in-vehicle entertainment.

SUMMARY

In one embodiment, a method of delivering content to an occupant in a vehicle, the method comprising: establishing an Internet connection using an electronic cellular device, the electronic device being integrated with an HMI system of the vehicle, the HMI system including HMI controls; searching for a content source providing an Internet media stream by selecting a content category using the HMI controls; connecting to the content source using the Internet connection; and playing the Internet media stream using a speaker of the vehicle.

In another embodiment, a system for delivering content to an occupant in a vehicle includes an HMI system and a head unit having a display including HMI controls. An electronic cellular device is integrated with the HMI system. The electronic cellular device is configured to establish an Internet connection and includes logic that searches for a content source that provides an Internet media stream upon occupant selection of a content category using the HMI controls.

In another embodiment, a method of delivering content to an occupant in a vehicle, the method comprising: integrating a portable electronic cellular device with an HMI system of the vehicle, the HMI system including HMI controls; establishing an Internet connection using the portable electronic cellular device; searching for an Internet radio station providing an Internet radio stream by selecting a content category using the HMI controls; connecting to the Internet radio stream using the Internet connection; and playing the Internet media stream using a speaker of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 illustrates an exemplary database table according to one or more embodiments shown and described herein.

DETAILED DESCRIPTION

Embodiments described herein generally relate to systems and methods of providing user-selectable audio and/or video content to vehicles. The content that can be distributed via the system may include music, radio shows, audio books, video information such as news, TV, movies, and the like. The content may also include weather reports, traffic conditions, sports news, stock market reports, and the like. As will be described in greater detail below, the content may be delivered to the vehicle using a cellular phone link to the Internet.

Figure 1:
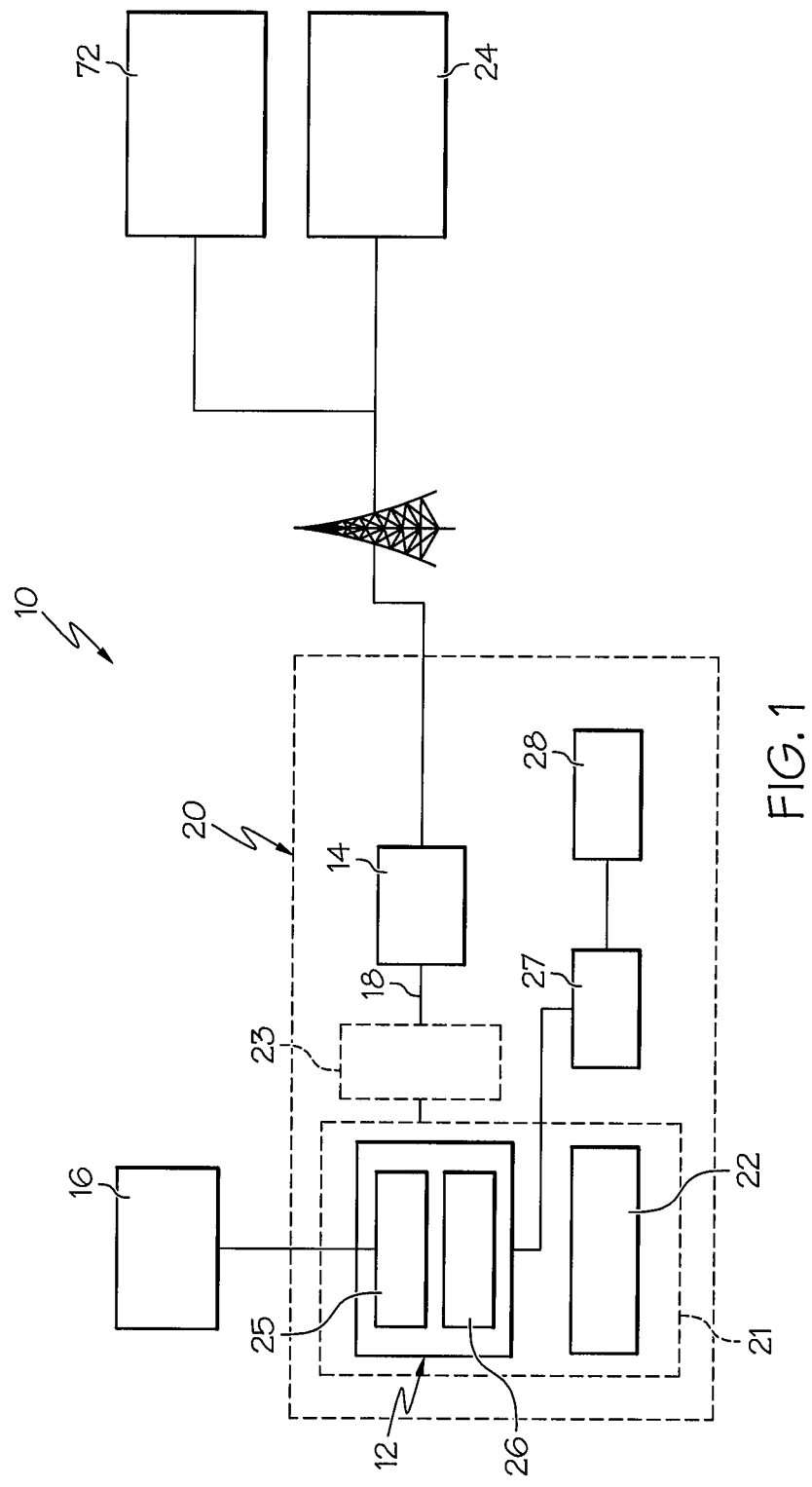
FIG. 1 is a diagrammatic view of a high-level architecture of a content distribution system according to one or more embodiments shown and described herein.

In some embodiments, the system provides organized access to various content providers, such as streaming Internet radio feeds and podcasts, via the cellular phone link to the Internet. The content can then be played through the vehicle's audio/video systems. Referring to FIG. 1, an exemplary high-level architecture of a content distribution system 10 includes a head unit 12 within a vehicle (represented by dotted lines 20) that is connected to a portable electronic cellular device (e.g., a cellular phone 14) and a global positioning system 16 (GPS) using any suitable connections such as wired and/or wireless connections. The head unit 12 may be a combination of radio and navigation systems, the term "head unit" referring generally to the electronic control unit that runs at least some of the user-selectable content in the vehicle.

In some embodiments, the cellular phone 14 may be integrated into the vehicle's human machine interface (HMI) system (represented by dotted lines 21) using any suitable means, such as via a portable electronic cellular device gateway 23. The "HMI system" refers to the collection of devices and interactive elements through which the vehicle 20 (and external services) present themselves to the operator. For example, the HMI system 21 may include an audio and/or video display (e.g., a radio display) through which the operator may select from a variety of content providers. In one embodiment, an HMI manager 22 may be provided. The HMI manager 22 may arbitrate HMI resources among a variety of applications and provide a toolbox of graphical components to support the user interface for the applications. The HMI manager 22 may be capable of presenting both visual and audible information. Such an integration between the cellular phone 14 and the vehicle's HMI system can facilitate a wireless connection (represented by line 18) between the cellular phone 14 and the head unit 12. The cellular phone 14 may be configured to be linked to one or more Internet radio broadcast streams 24 via a cellular connection (e.g., a 3G link) with the Internet. A content server 72 that is accessible by the cellular phone 14 over the Internet connection may include Internet station information, for example, saved in a database table. The Internet station information may be used by the cellular phone 14 to connect to an Internet broadcast stream, as will be described in greater detail below.

As indicated above, the head unit 12 may be connected to the GPS 16. The GPS 16 may send vehicle position information to the navigation system 25 of the head unit 12. As will be described below, the vehicle position information provided by the GPS 16 may be used by the head unit 12 in selecting a particular content source to satisfy a user request. The head unit 12 may also control a radio system 26, such as an AM/FM radio capable of receiving terrestrial radio broadcasts. In some embodiments, the radio system 26 may be capable of receiving other types of broadcasts, such as satellite radio broadcasts. The radio system 26 may be connected to an amplifier 27 and a speaker system 28 of the vehicle 20 and the audio content may be played through the speaker system 28.

Figure 2:
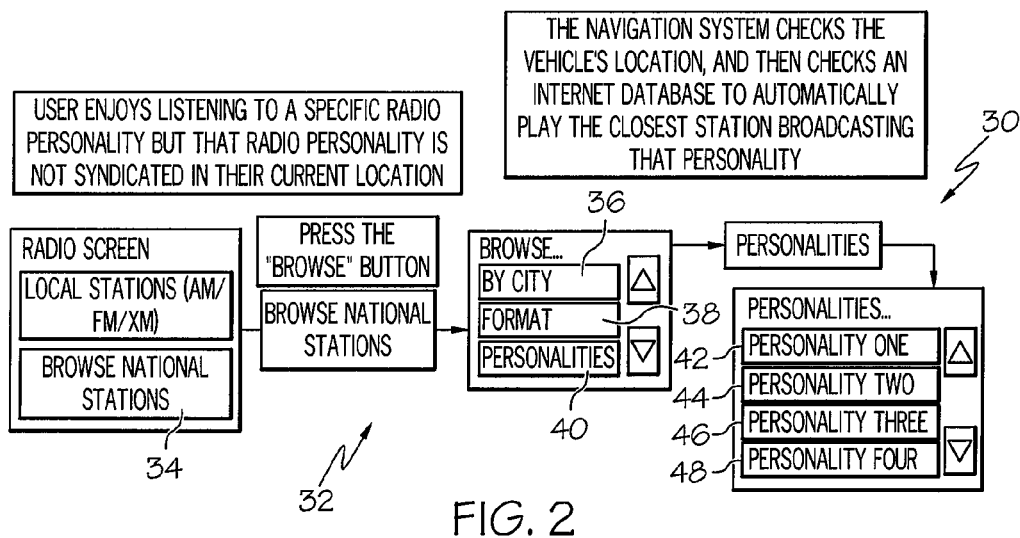
FIG. 2 is a diagrammatic illustration of a display for selecting content according to one or more embodiments shown and described herein.

Referring now to FIG. 2, an exemplary display 30 is illustrated that is used to control selection of a content source. In the exemplary display 30, the various Internet radio broadcast streams 24 are organized in a hierarchy of categories (displayed generally as controls 32) such that any of the categories may be operator selected by format and not by the band or frequency of the station. In some embodiments, the controls 32 may be mapped to the controls of the cellular phone 14 in the HMI manager 22. In other embodiments, the controls 32 may be used to control applications of the cellular phone 14, such as Pandora, Slacker, iheartradio, etc. For example, the head unit 12 and the cellular phone 14 may include software configured to allow the head unit 12 to access and control operation of various applications and functions on the cellular phone 14. Thus, it may be possible to use the controls 32 for cellular phone 14 control in addition to control of the head unit 12.

The display 30 may be any suitable display device used in a head unit, such as, for example, but not limited to LCD display devices, LED display devices, OLED display devices, and other types of display devices which may be heretofore developed. Further, the display 30 may include any variety of indicators, including, but not limited to a series of lights and/or other types of light devices as opposed to a single, integrated display screen. The display 30 may include an electronic paper component such as an electrophoretic display, which may be an information display that forms visible images by rearranging charged pigment particles using an electric field. The display 30 may be used for electronically displaying graphics, text, and other elements to an occupant. In some embodiments, the display 30 may be a touch-screen user interface that is used with the tip of a finger of the user and/or a stylus or other touching device to select elements from the screen, to draw figures, and to enter text with a character recognition program running on the head unit 12.

In the example of FIG. 2, the operator may desire to listen to a specific radio personality, but that personality may not be available on terrestrial radio (Local Radio Stations) at the current vehicle location. In this event, the operator may select the Browse National Stations button 34 of the controls 32. When the Browse Nation Stations button 34 is selected, the operator may be prompted to choose between a By City button 36, which is used to browse Internet radio broadcast streams by city, a Format button 38, which is used to browse Internet radio broadcast streams by format, and a Personalities button 40, which is used to browse Internet radio broadcast streams by radio personality. Selection of the Personalities button 40 may allow the operator to select between various radio personalities, such as Personality One button 42, Personality Two button 44, Personality Three button 46, Personality Four button 48, and so on. In some embodiments, selection of the desired personalities may be performed using the cellular phone 14, for example, using the cellular phone 14 itself, or by using the controls 32, which, in turn, control the cellular phone 14.

In some embodiments, once a particular personality is selected from the buttons 42, 44, 46 or 48, the head unit 12 may determine the vehicle's current location using the GPS location information. This location information may be used by the head unit 12 and/or cellular phone 14 to automatically select the radio station providing the Internet radio broadcast stream providing the radio personality that is geographically closest to the vehicle 20. In another embodiment, the location information may be used by the head unit 12 and/or cellular phone 14 to automatically select the radio station providing the Internet radio broadcast stream providing the radio personality that is upcoming on a route selected by the operator. Such automatic selection of the radio station based on location of the vehicle 20 can allow the head unit 12 to automatically switch from the Internet radio broadcast stream to the terrestrial radio broadcast, once the vehicle 20 is in range of the terrestrial broadcast of the radio station playing the selected personality, which can reduce cellular phone usage. In some embodiments, for example, the head unit 12 may switch from an Internet radio broadcast stream to a terrestrial radio broadcast within a preselected range of the geographical location of the radio station. Also, the head unit 12 may switch from a terrestrial radio broadcast to an Internet radio broadcast stream when the vehicle 20 is out of range of the radio broadcast stream.

Figure 3:
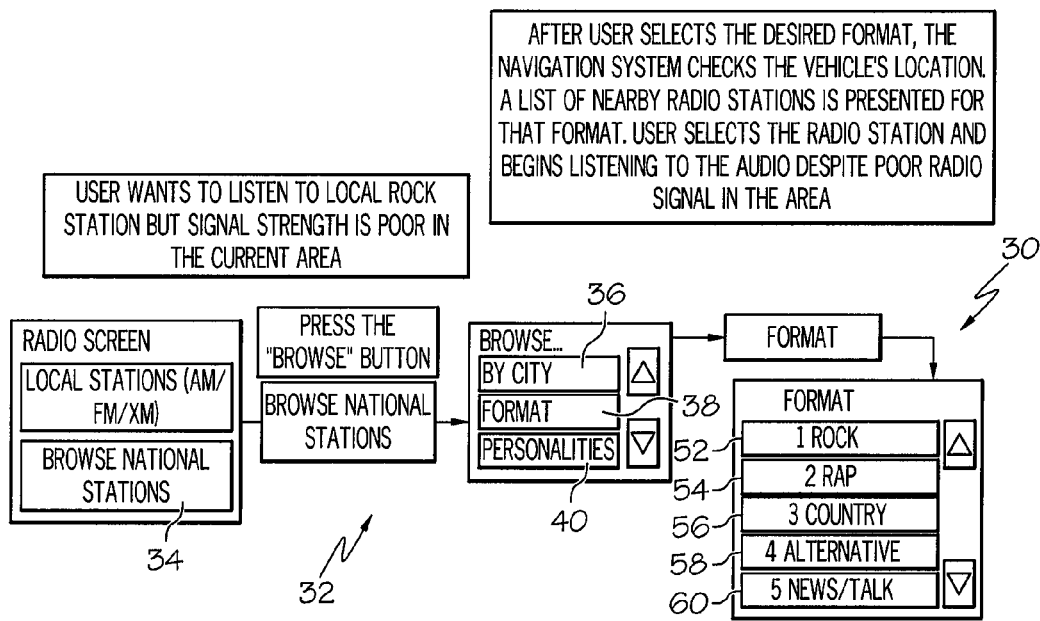
FIG. 3 is a diagrammatic illustration of another display for selecting content according to one or more embodiments shown and described herein.

Referring to FIG. 3, the exemplary display 30 is illustrated where the various Internet radio broadcast streams 24 are organized in the hierarchy of categories (displayed as controls 32) such that any of the categories may be operator selected by format and not by the band or frequency of the station. In this illustrative embodiment, the operator may desire to listen to a particular music format, such as rock. However, there may be few or no terrestrial radio broadcasts available in a particular area providing the desired format. In this event, the operator may select the Browse National Stations button 34 of the controls 32. When the Browse National Stations button 34 is selected, the operator may be prompted to choose between a By City button 36, which is used to browse Internet radio broadcast streams by city, a Format button 38, which is used to browse Internet radio broadcast streams by format, and a Personalities button 40, which is used to browse Internet radio broadcast streams by radio personality. Selection of the Format button 38 may allow the operator to select between various formats, such as a Rock button 52, a Rap button 54, a Country button 56, an Alternative button 58, a News/Talk button 60, and so on. In some embodiments, selection of the format may be performed using the cellular phone 14, for example, using the cellular phone 14 itself, or by using the controls 32, which, in turn, control the cellular phone 14.

As above, once a particular format is selected from the buttons 52, 54, 56, 58 and 60, the head unit 12 may determine the vehicle's current location using the GPS location information. This location information may be used by the head unit 12 and/or cellular phone 14 to automatically select the radio station providing the Internet radio broadcast stream having the desired format that is geographically closest to the vehicle 20. In another embodiment, the location information may be used by the head unit 12 and/or cellular phone 14 to automatically select the radio station providing the Internet radio broadcast stream having the desired format that is upcoming on a route selected by the operator. Such automatic selection of the radio station based on location of the vehicle 20 can allow the head unit 12 to automatically switch from the Internet radio broadcast stream to the terrestrial radio broadcast, once the vehicle 20 is in range of the terrestrial broadcast of the radio station playing the selected format, which can reduce cellular phone usage. Also, the head unit 12 may switch from a terrestrial radio broadcast to an Internet radio broadcast stream when the vehicle 20 is out of range of the radio broadcast stream.

Referring to FIG. 4, Internet station information may be saved in a database table 70. In one embodiment, the exemplary database table 70 may be located on the content server 72 (FIG. 1) that is accessible by the cellular phone 14, for example, over the Internet connection. In another embodiment, the database table 70 may be downloaded to the cellular phone 14 and/or the head unit 12 and saved in memory. Where the database table 70 is downloaded to the cellular phone 14 and/or head unit 12, the database table 70 may be updated periodically (e.g., automatically and/or on demand). In some embodiments, the database table 70 may be updated (e.g., added to, modified, etc.) by the operator. In these embodiments, an update application may be provided on the cellular phone 14 and/or head unit 12 for use in filling the database table 70 with Internet station information. The database table 70 may include, but not limited to, information such as radio station call letters 73, radio station frequency 74, radio station location 76, radio station format 78 and URL 80 of the streaming radio. Fields such as latitude, longitude and coverage radius may also be included, as further examples.

The cellular phone 14 may include software and software drivers for use in selecting and playing the Internet radio broadcast stream. In some embodiments, the cellular phone 14 includes an Internet browser and a media player for use in playing the Internet broadcast stream. In some embodiments, the software and software drivers may reside in the HMI system 21. In embodiments where the software drivers reside in the cellular phone 14, a wireless standard, such as Bluetooth, may be used to communicate with the HMI manager 22.

Figure 5:
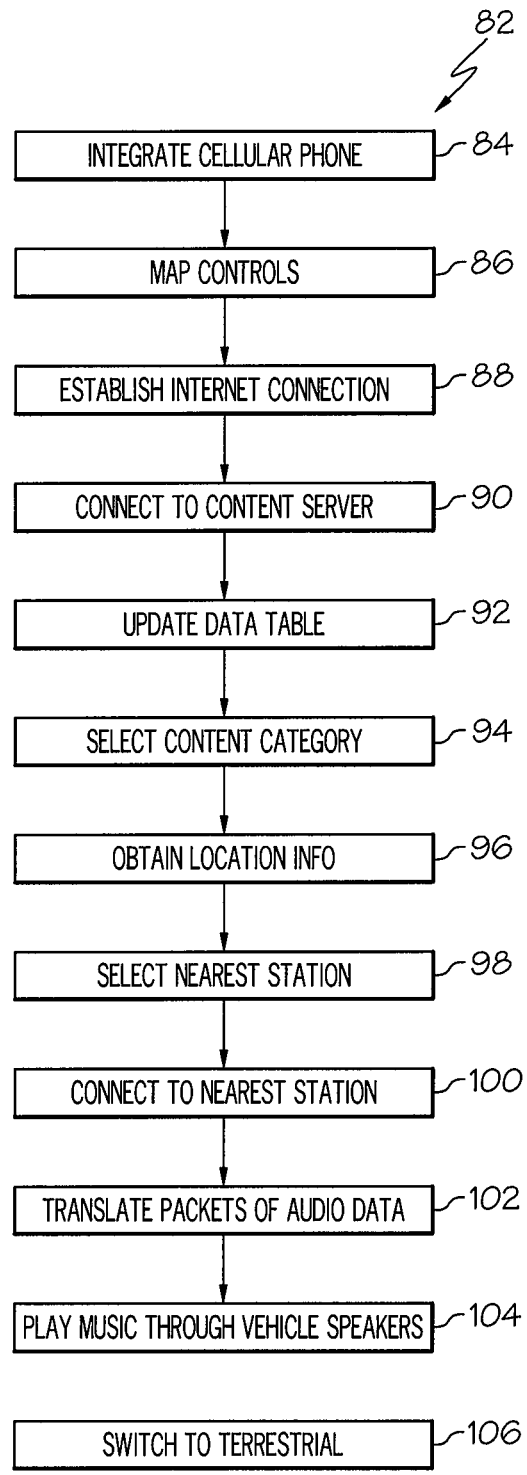
FIG. 5 illustrates a method of delivering content to an occupant in the vehicle according to one or more embodiments shown and described herein.

Referring to FIG. 5, an exemplary method 82 of delivering content to an occupant in the vehicle 20 includes integrating the cellular phone 14 with the HMI system 21 of the vehicle at step 84 (e.g., using a Bluetooth connection). In some embodiments, the HMI controls 32 of the HMI system 21 may be mapped to controls of the cellular phone 14 at step 86. Such mapping can allow operator control of the cellular phone 14 from the head unit 12 (e.g., using the radio display). In some embodiments, the head unit 12 and the cellular phone 14 may include software configured to allow the head unit 12 to access and control operation of various applications and functions on the cellular phone 14. At step 88, an Internet connection is established using the cellular phone 14. The Internet connection may be established upon the occupant's selection of the Browse National Stations button 34 (FIG. 2). In some embodiments, the cellular phone 14 may establish a connection with the content server 72 using the Internet connection at step 90, which can allow for searching of the database tables to identify a particular radio station. In some embodiments, the database tables may be located at the cellular phone 14 and/or the head unit 12. In these embodiments, the connection with the content server 72 may be used to update the database tables located at the cellular phone 14 and/or the head unit 12 at step 92. At step 94, the occupant may search for a radio station providing an Internet radio stream by selecting a content category using the HMI controls in a fashion similar to those described above with regard to FIGS. 2 and 3. Once a suitable category is chosen, the head unit 12 and/or cellular phone 14 may obtain vehicle location information from the GPS 16 at step 96. The head unit 12 and/or cellular phone 14 may include logic that selects the nearest radio station that satisfies the selected content category at step 98 using station location information in the database table and the vehicle location information obtained from the GPS 16. Once the nearest radio station is selected, the cellular phone 14 may initiate a connection with the radio server using the URL associated with the radio server in the database table at step 100. Once the cellular phone 14 connects to the URL of the selected radio server, the cellular phone 14 may begin receiving audio data from the streaming audio source. In other instances, the head unit 12 and/or cellular phone may bypass determining the nearest radio station. In some embodiments, the cellular phone 14 receives the streaming audio data in packets from the radio server. The cellular phone 14 or the head unit 12 may then translate the packets to audio data within the vehicle 20 at step 102. Translation of the packets to audio data may be accomplished by any suitable method, such as MP3, WAV, AIFF, etc. Once the packets are assembled into a continuous audio stream, the audio stream may be played through the vehicle radio at step 104. In some embodiments, the head unit 12 may switch over to the terrestrial broadcast of the radio station once within a preselected distance of the radio station or when the head unit determines the terrestrial broadcast can be received at step 106. In some embodiments, the head unit 12 may switch from a terrestrial radio broadcast to an Internet radio broadcast stream when the vehicle 20 is out of range of the radio broadcast stream.

In some embodiments, the head unit 12 may instruct the cellular phone 14 to access music applications, such as automated music recommendation services, such as Pandora, or Internet radio services, such as Slacker, iheartradio, etc. For example, the occupant may select a category associated with a particular band, music group, personality, or the like. In these instances, the particular band, music group, personality, etc. may be entered into one of the music applications such that the content may be played using the music application rather than streaming directly from the Internet radio station. Thus, the music application controls may be seen on the display of the cellular phone 14 while the HMI controls are visible on the radio display.

The above-described content distribution system 10 allows for selection of an Internet radio stream based on category and not based on frequency of the radio station. In some embodiments, a link to the selected Internet radio stream is provided by a portable electronic cellular device, such as a cellular phone, that is linked to the Internet and includes a web browser and media player for playing the streaming broadcast. The content distribution system 10 may provide organized searching of Internet radio stations through use of database tables populated by Internet radio station information. In some embodiments, the portable electronic device may be integrated seamlessly into the vehicle's HMI system for convenient operation of the portable electronic device.

While particular embodiments have been illustrated and described herein, it should be understood that various other changes and modifications may be made without departing from the spirit and scope of the claimed subject matter. For example, while a portable electronic cellular device, such as a cellular phone, is described above, the above content distribution system 10 may utilize other electronic cellular devices that are non-portable such as those implemented in a vehicle's telematics. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of delivering content to an occupant in a vehicle, the method comprising:

establishing an Internet connection for an HMI system of the vehicle using an electronic cellular device, the HMI system including HMI controls;

providing an option for a particular program, wherein the option is provided by the HMI system and the electronic cellular device;

receiving a user request for the particular program, the particular program being provided via the internet connection;

searching for a content source providing an Internet media stream of the particular program;

connecting to the content source using the Internet connection;

playing the Internet media stream of the particular program using a speaker of the vehicle;

obtaining vehicle location information using a GPS and wherein searching for an Internet radio stream includes determining the nearest radio station providing the particular program;

obtaining, based on the vehicle location, a location of the nearest radio station that is broadcasting the particular program at a frequency that corresponds to a traditional terrestrial radio station;

automatically switching to the frequency of the nearest radio station when the vehicle is in a predetermined range of the location of the nearest radio station;

automatically switching back to the internet connection, upon a determination that the vehicle exits the predetermined range of the location of the nearest radio station;

storing, by the vehicle, the frequency of the nearest radio station and the predetermined range of the nearest radio station for subsequent use when the vehicle again enters the predetermined range;

retrieving the stored frequency and the stored predetermined range of the nearest radio station;

detecting, based on the stored data, that the vehicle returns to a location within the predetermined range of the nearest radio station; and using the stored frequency data to establish a connection with the nearest radio station and terminating the internet connection.

2. The method of claim 1, wherein the HMI system includes a radio display.

3. The method of claim 1 further comprising obtaining vehicle location information using a GPS and wherein the step of searching for an Internet radio stream includes determining the nearest radio station providing the particular program.

4. The method of claim 1, wherein the electronic device is a portable electronic cellular device, the method further comprising integrating the portable electronic device with the HMI system of the vehicle.

5. The method of claim 1 further comprising mapping the HMI controls of the HMI system to controls of the portable electronic cellular device.

6. The method of claim 1, wherein the step of searching for the content source providing the Internet media stream includes searching for an Internet radio station providing an Internet radio broadcast stream.

7. The method of claim 6 further comprising:
the electronic cellular device receiving streaming audio data in packets from the Internet radio station; and
translating the packets to audio data within the vehicle.

8. The method of claim 1, wherein the step of searching for the content source providing the Internet media stream includes connecting to an automated music recommendation service or an Internet radio service.

9. The method of claim 1 further comprising controlling the electronic cellular device using the HMI controls.

10. A system for delivering content to an occupant in a vehicle, the system comprising:
a human machine interface (HMI) system;
a head unit having a display including HMI controls;
and an electronic cellular device integrated with the HMI system, wherein the electronic cellular device provides an option for a particular program, and establishes an Internet connection and includes logic that causes the electronic cellular device to search for a content source that provides the particular program on an Internet media stream upon an occupant selection using the electronic cellular device, connecting to the content source using the Internet connection;

playing the Internet media stream of the particular program using a speaker of the vehicle;

obtaining the vehicle location using a vehicle location navigation system and wherein searching for an Internet radio stream includes determining a radio station that provides the particular program within the vehicle's detection range;

wherein upon determining that the vehicle reaches a geographical location with a traditional terrestrial station that broadcasts the particular program, the head unit automatically causes selection of a frequency that corresponds to the traditional terrestrial station to provide the particular program in the vehicle, wherein the head unit automatically causes a switch back to the internet connection, upon a determination that the vehicle exits the geographical location with the traditional terrestrial station, and wherein the frequency of the traditional terrestrial station and a broadcast range of the traditional terrestrial station are stored for subsequent use when the vehicle again reaches the geographical location.

11. The system of claim 10, wherein the electronic cellular device is a cellular phone.

12. The system of claim 10, wherein the head unit includes a radio system and a navigation system.

13. The system of claim 10, wherein the electronic cellular device includes an Internet browser and media player.

14. The system of claim 10, wherein controls of the electronic cellular device are different from the HMI controls when searching for a content source.

15. A method of delivering content to an occupant in a vehicle, the method comprising:
integrating a portable electronic cellular device with an HMI system of the vehicle, the HMI system including HMI controls;

establishing an Internet connection using the portable electronic cellular device;

providing an option for a particular program, wherein the option is provided by the HMI system and the electronic cellular device;

searching for the particular program on an Internet radio station providing an Internet radio stream by selecting the particular program using the HMI controls;

connecting to the Internet radio stream using the Internet connection;

playing the Internet media stream using a speaker of the vehicle;

obtaining vehicle location information;

determining, based on the vehicle location information, a terrestrial station that broadcasts a traditional terrestrial station frequency of the particular program;

obtaining the vehicle location information using a vehicle location navigation system and wherein the step of search for an Internet radio stream includes determining the nearest terrestrial station providing the particular program;

upon the vehicle reaching a geographical location for receiving broadcasts from the terrestrial station, automatically disconnecting from the Internet radio stream using the Internet connection and tuning to the terrestrial station broadcast;

upon a determination that the vehicle exits the geographical location of the terrestrial station, automatically disconnecting from the terrestrial station broadcast and connecting to the internet connection: and storing the frequency of the terrestrial station and a broadcast range of the terrestrial station for subsequent use when the vehicle again enters the geographical location.

16. The method of claim 15, wherein the HMI system includes a radio display.

17. The method of claim 15 further comprising mapping the HMI controls of the HMI system to controls of the portable electronic cellular device.

18. The method of claim 15 further comprising:
the portable electronic cellular device receiving streaming audio data in packets from the Internet radio station; and
translating the packets to audio data within the vehicle.

* * * * *